Feb. 11, 1969

W. E. BRIGGS 3,426,581

VACUUM VALVES FOR LEAK DETECTORS AND THE LIKE

Filed Dec. 13, 1966

United States Patent Office 3,426,581
Patented Feb. 11, 1969

3,426,581
VACUUM VALVES FOR LEAK DETECTORS AND THE LIKE
Walton E. Briggs, Lynnfield, Mass., assignor to National Research Corporation, Newton, Mass., a corporation of Massachusetts
Filed Dec. 13, 1966, Ser. No. 601,515
U.S. Cl. 73—40.7    9 Claims
Int. Cl. G01m *3/04*

ABSTRACT OF THE DISCLOSURE

Water vapor is injected into vacuum valves to provide a monolayer lubricating film on the valving member which reduces gasket damage. This provides a reduction in "noise" for vacuum valves used in systems which are sensitive to gas composition.

RELATED APPLICATIONS

Figure 1:
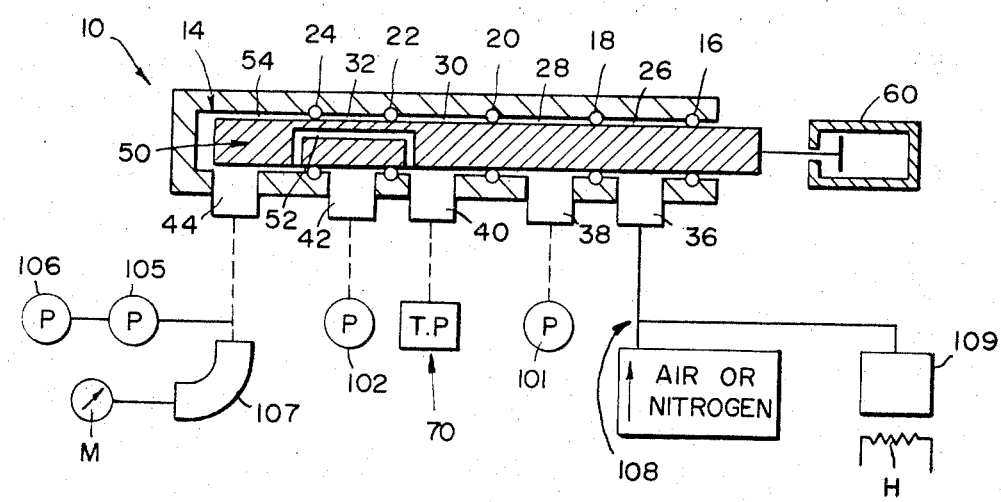

Briggs, Ser. No. 544,312, now U.S. Patent No. 3,385,102.

BACKGROUND

The field of the invention is vacuum valves of the type which have a valving member closely spaced from a valve body and a rubbery gasket compressed therebetween. Examples of such valves are vacuum ball valves and spool valves, the latter being described in the above-cited application. It is a problem in such valves when they are used in a cyclic repetitive operations that the gaskets are deformed and leakage occurs. While leakage per se is undesirable, a more serious aspect of the problem is that, in gas-composition-sensitive systems employing vacuum valves, the leakage may introduce noise into the system. For instance, in modern versions of the mass spectrometer leak detector, a spool valve is used to connect a test piece to a first mechanical pump, a second mechanical pump and then a diffusion pump in quick sequence. While connected to the diffusion pump, the test piece is also connected to a mass spectrometer. A trace gas (e.g. helium) is sprayed over the test piece and if there are leaks in the test piece, the helium will reach the mass spectrometer which is tuned to detect helium. After the test the spool valve direction is reversed and it connects the test piece to an air release port to allow the test piece to be raised to air pressure for unloading. All the foregoing is more fully described in the above-cited application. If the valve develops a substantial leak in one or more of the gaskets, a significant amount of atmospheric helium may reach the mass spectrometer during subsequent cycles and this noise would mask true leak detection signals.

In working with the system described in the above application, it has been discovered that this source of noise is significant and that it is somewhat attenuated by the atmospheric content of water vapor. This discovery was made fortuitously by using cold nitrogen vapors from a vacuum cold trap as a convenient air release gas. When this was done, the noise level of a particular mass spectrometer leak output signal went from a level of $10^{-8}$ to $10^{-7}$ atm. cc./sec. He, an order of magnitude increase. It was reasoned that the significant difference between the cold nitrogen vapors and normal venting gas was the absence of background water vapor which is condensed out by the cold nitrogen. A return to the use of room air returned the noise level down to $10^{-8}$ atm. cc./sec. He and injection of water vapor as described below reduced the noise level to $10^{-9}$ atm. cc./sec. He. The present invention is thus based on reasoning backwards from a fortuitous discovery to determine a cause of a problem. Having determined that cause, a simple solution is now set forth.

GENERAL SUMMARY

The present invention comprises an improvement in vacuum valves wherein water vapor, or equivalent lubricating vapor, is injected into the vent zone of the valve. Preferably, the movement of the valve to its vent position provides the necessary suction, although alternative injection arrangements are possible. Between valving cycles, the water vapor condenses at least a monolayer on the valving member which enables it to slide past the critical gaskets without friction and without permanent deformation of the gaskets.

DRAWINGS

Figure 2:
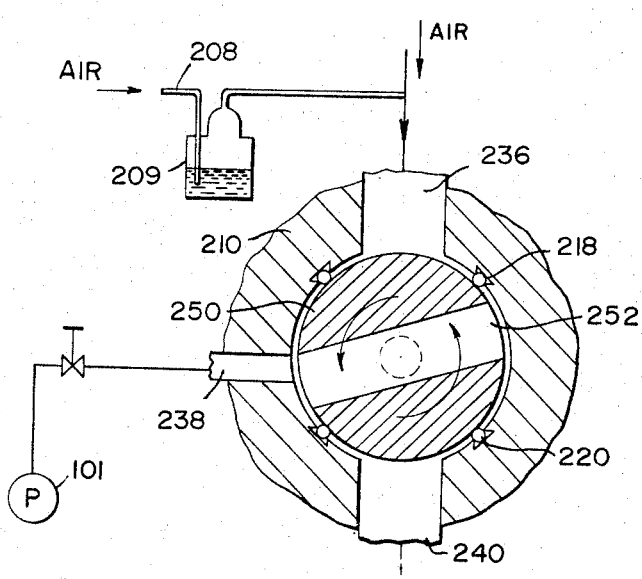
Figure 3:
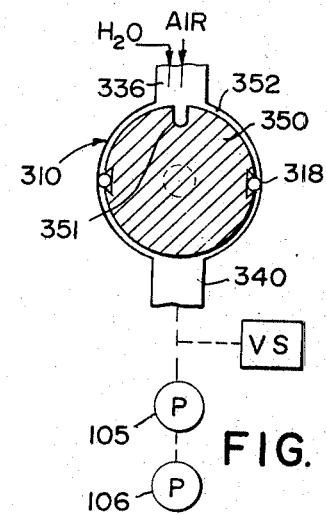

FIG. 1 shows a preferred and distinctly advantageous embodiment of the invention used in a leak detector system and FIGS. 2 and 3 show second and third embodiments of the invention, all of FIGS. 1–3 being schematic diagrams.

Referring to FIG. 1 there is shown a mass spectrometer leak detector system with a valve body 10 connected to mechanical vacuum pumps 101 and 102 and to a test piece 70 and a mass spectrometer 107 (with a meter M) which is continuously evacuated by a diffusion pump 105 and a mechanical pump 106 and to a venting means which can be as simple as a piece of tubing open at one end to room air or connected to a nitrogen gas reservoir. A water bottle 109 is connected to the venting means.

Within the valve body there is a tunnel 14 and a spool valving member 50 mounted to reciprocate in tunnel 14 when driven by a servomotor 60. A series of rubbery O-ring gaskets 16, 18, 20, 22 and 24 are mounted in the valve tunnel 14 and these, together with the tunnel and spool structure, form a series of manifolds at positions 26, 28, 30, 32, 54. A series of ports 36, 38, 40, 42, 44 are connected to these manifolds. An internal passage 52 in the spool 50 provides communication between the manifolds. The spool 50 is preferably made of steel with a vacuum-compatible lubricating surface layer such as Teflon or chrome plate, the latter being preferable in leak detectors since Teflon tends to absorb helium. The rubbery gaskets may be any of the synthetic or natural rubbers or plastics commonly used in vacuum plumbing (and essentially all of which are benefitted by the present invention).

In operation, the spool 50 is initially retracted so that passage 52 connects ports 36 and 40. Then as motor 60 moves spool 50 to the left passage 52 connects port 40 to port 38 and cuts off port 36; then connects port 40 to port 42; and finally connects port 40 to port 44, all in quick sequence as spool 50 is moved, without stopping until it reaches the end position shown in FIG. 1. Upon reversal of motor 60, the sequence is reversed as spool 50 moves back to its initial position. Upon reaching the initial position, port 40 under vacuum becomes connected to port 36 at atmospheric or other venting pressure allowed by the air release means 108. This suction draws air from 108 through passage 52 to port 40 to vent test piece 70 to allow unloading. The same suction draws water from source 109. The water vapor coats the portions of the spool 50 which must slide past every gasket. Although the coating is re-evaporated by exposure to the various vacuum pumps, it is reapplied with the venting at the end of every valve cycle and this is sufficient to make a great deal of difference in gasket reliability.

A second embodiment of the invention is shown in FIG. 2. A vacuum valve body 210 contains a ball valve valving member 250 with an internal valving passage 252. The valving passage selectively connects a first port 240 to a second port 236 in a first position of the valving member and cuts off that connection in a second position (shown in the drawing) of the valving member. Subsequently, further counterclockwise movement of the valving member returns it to the first position where venting gas (air pressure from line 208) and water from bottle 209 are admitted to coat the valving member surface on top (and on bottom after passing through passage 252). In this way every cyclic revolution of the valving member produces a lubricating film which is effective to protect O-rings 218 and 220. The venting air is bubbled through the water to provide an optimum mixing of air and water vapor. If desired, a roughing mechanical pump 101 may be connected to the valving passage via port 238.

Figure 2A:
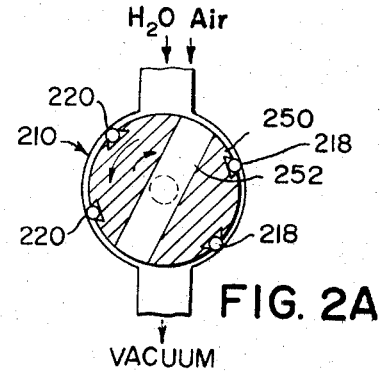

A variation of the FIG. 2 embodiment is shown in FIG. 2A wherein the ball valve constitutes a simple cut-off valve rotated back and forth by hand.

A third embodiment of the invention is shown in FIG. 3 wherein the valving passage 352 consists solely of the space formed between valving member 350 and valve body 310. The valving member carries the gasket 318 which must be bypassed to make connection from the first vacuum port 340 (leading to diffusion pump 105, backing pump 106 and a vacuum system VS), to the second venting port (connected to the air and water vapor sources). The vacuum system VS might be a vacuum coater, an analytical mass spectrometer, a gas chromatography analyzer, etc. A groove 351 could be cut into ball 350 to handle a solid mass sample admitted during venting. The elongated small area passage 352 provides good throttling when ports 340 and 336 are connected, but sufficient suction to pull water vapor in.

Several variations can be made within the scope of the present invention. For instance, the lubricating fluid may be silicone oils or similar low vapor pressure chemicals instead of water. For instance, hexamethyldisiloxane and other known polysiloxanes have properties of lubrication ability and volatility equal to or better than water for present purposes and are readily pumped by the mechanical, diffusion and cryogenic pumps available in vacuum systems where improved valves of the present invention are used. Adaptations of the above-described valves and locks (both referred to as "valves" herein) can be made where the valve body moves while the valving member remains stationary. Still other variations will be apparent to those skilled in the art when guided by the present disclosure. It is therefore intended that the above disclosure and accompanying drawings shall be read as illustrative and not in a limiting sense.

What is claimed is:

1. In apparatus of the class described, a valve body with at least first and second ports; a valving member mounted in operative relationship with said valve body so that they form a valving passage therebetween which includes a rubbery gasket which must be bypassed by relative movement of the valve body and valving member and the body and member being constructed and arranged so that the valving member and valve body are relatively movable between at least a first position wherein the valving passage connects the first and second ports and a second position wherein such connection is cut off; a source of vacuum connected to the first port; and a source of venting pressure and a source of lubricating vapor connected to the second port.

2. In the apparatus of claim 1 the valve body having at least first, second and third ports, the valving member having an internal passage as said valving passage for the valve, the internal passage of the valving member connecting the first and second ports in the first position of the valving member and connecting the first and third ports in said second position of the valving member.

3. In the apparatus of claim 2 wherein the third port is connected to a mass sensitive instrument, the first port being a leak test port and the second port being an air release port connected to said venting means.

4. In the apparatus of claim 1 wherein the valving member is physically moved.

5. In the apparatus of claim 4 wherein the valve is a spool valve.

6. In the apparatus of claim 4 wherein the valve is a ball valve.

7. The method of improving the performance of vacuum valves which utilize sliding motion past rubbery gaskets wherein a lubricating vapor is injected into the valving passage during essentially every valving cycle.

8. The method of claim 7 wherein the lubricating vapor is water vapor in excess of atmospheric background.

9. The method of claim 7 wherein the lubricating vapor is stored as a liquid with equilibrium vapor above it and wherein a venting gas is bubbled through said liquid and equilibrium vapor storage and then injected into the valve passage.

References Cited

UNITED STATES PATENTS 3,270,766   9/1966   Stone _____ 137—246.22

LOUIS R. PRINCE, *Primary Examiner.*

J. NOLTON, *Assistant Examiner.*

U.S. Cl. X.R.

137—246, 246.13, 246.22; 184—1; 277—17